No. 657,245. Patented Sept. 4, 1900.
L. J. LINDSAY.
CHECK ROW CORN PLANTER.
(Application filed Feb. 15, 1900.)
(No Model.) 2 Sheets—Sheet 1.
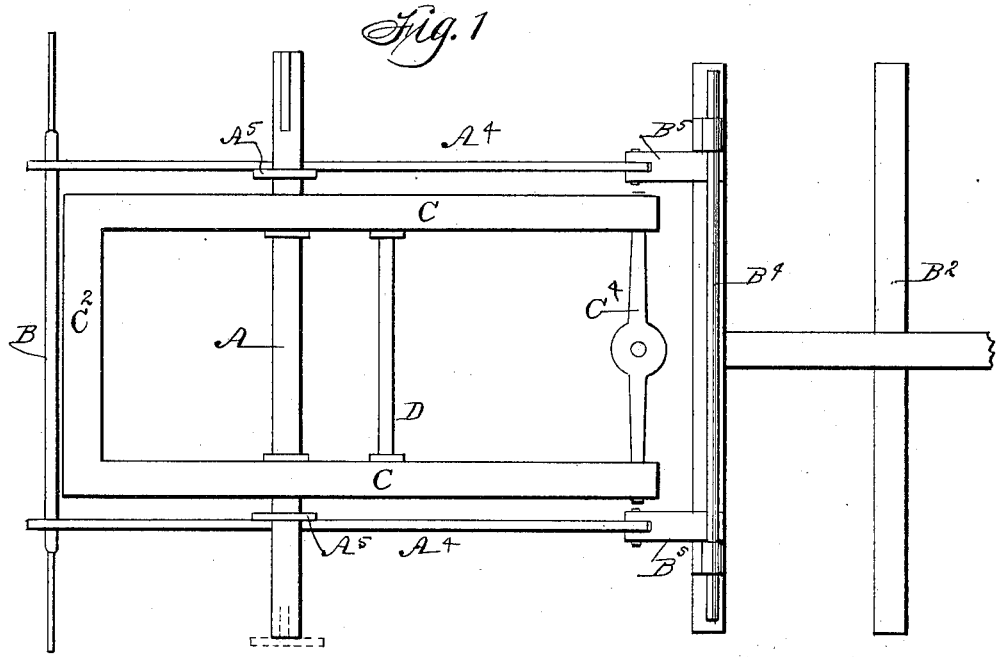
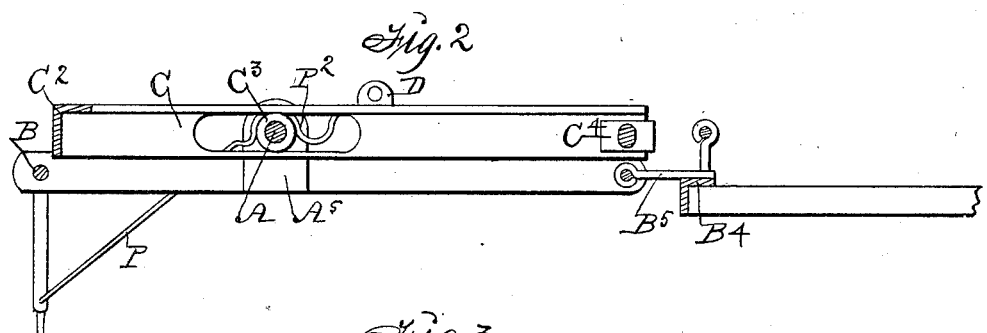
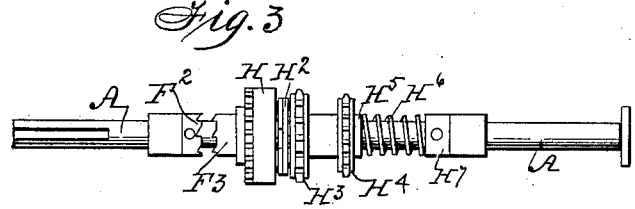
Witnesses: F. C. Stuart, R. B. Orwig.
Inventor: Leroy J. Lindsay,
By Thomas G. Orwig, Attorney.

No. 657,245. Patented Sept. 4, 1900.
L. J. LINDSAY.
CHECK ROW CORN PLANTER.
(Application filed Feb. 15, 1900.)
(No Model.) 2 Sheets—Sheet 2.
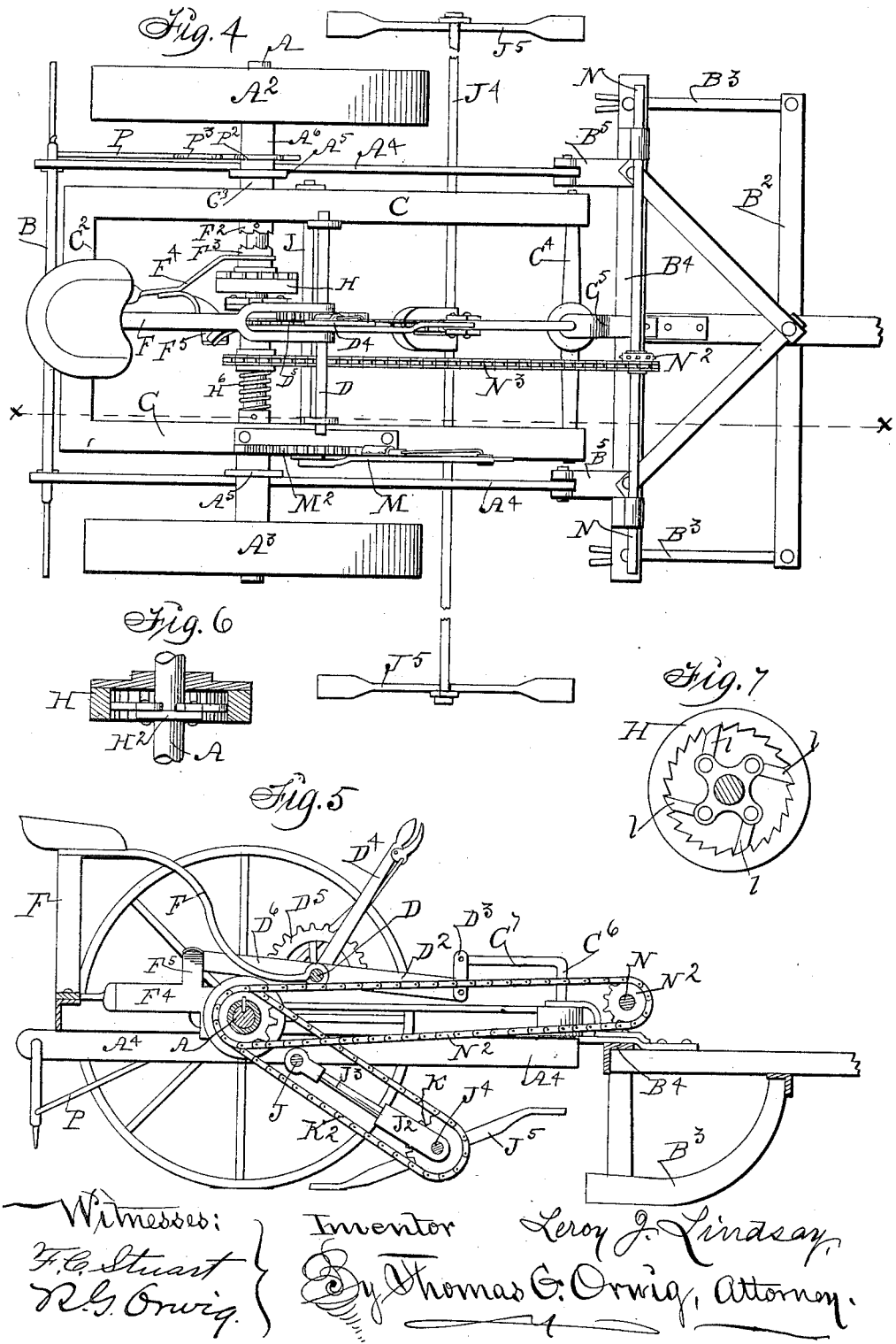

UNITED STATES PATENT OFFICE.

LEROY J. LINDSAY, OF SEYMOUR, IOWA, ASSIGNOR OF ONE-HALF TO J. T. PHILLIPS, OF SAME PLACE.

CHECK-ROW CORN-PLANTER.

SPECIFICATION forming part of Letters Patent No. 657,245, dated September 4, 1900.

Application filed February 15, 1900. Serial No. 5,312. (No model.)

*To all whom it may concern:*

Be it known that I, LEROY J. LINDSAY, a citizen of the United States, residing at Seymour, in the county of Wayne and State of Iowa, have invented a new and useful Automatic Check-Row Corn-Planter, of which the following is a specification.

My object is to provide an automatic corn-planter specially adapted for different kinds and conditions of ground in which seeds are to be dropped at regular intervals of time and space as required to simultaneously plant two rows as required to produce check-rows.

My invention consists in the construction, arrangement, and combination of elements and subcombinations, as hereinafter set forth, pointed out in my claims, and illustrated in the accompanying drawings, in which—

Figure 1 is a top view of the carriage-frame and an auxiliary frame pivotally connected with each other and the runners as required to allow lateral motion and also vertical motion relative to the carriage-axle and the frame to which runners are fixed. Fig. 2 is a longitudinal sectional view, showing the manner of connecting the frames with the carriage-axle. Fig. 3 shows a clutch, a ratchet-wheel, two sprocket-wheels, a coiled spring, and fixed collars connected with the rotatable carriage-axle. Fig. 4 is a top view of the machine, showing the relative positions of all the operative parts. Fig. 5 is a vertical longitudinal sectional view on the line $x$ $x$ of Fig. 4. Fig. 6 is a transverse sectional view, and Fig. 7 a side view, of the internally-toothed ratchet-wheel and a plurality of pawls connected with the rotatable carriage-axle for transmitting motion from the carriage-axle to the rotatable axle of a marker to regulate the speed of seed-dropping mechanism as required to maintain equal distances between the points where seeds are planted in the parallel rows.

The letter A designates the rotatable carriage-axle, to which one traction-wheel $A^2$ is fixed by keying or in any suitable way, and $A^3$ a mating wheel mounted loosely on the other end of the axle.

$A^4$ represents the parallel side pieces of the carriage-frame, preferably made of flat metal bars and provided with fixed bearers $A^5$, through which the axle A is extended in such a manner as to allow lateral motion to the carriage-frame relative to the axle and line of advance when the planter is in operation. Sleeves $A^6$ on the axle A on the opposite sides of the bearers $A^5$ restrict the lateral motions of the side bars $A^4$. The rear ends of the bars $A^4$ are connected by means of a rock-shaft B, mounted in bearings formed in or fixed to said ends. The end portions of the rock-shaft are bent laterally, as indicated by full lines in Fig. 4, and adapted to serve as wheel-scrapers.

$B^2$ is the frame, to which mating runners $B^3$ are fixed. The rear cross bar or bench $B^4$, adapted for supporting seedboxes, (not shown,) has fixed hinge members $B^5$, to which the front ends of the side bars $A^4$ of the carriage-frame are hinged to allow vertical motion to the runners.

The auxiliary frame is composed of two mating side bars C, preferably made of angle-iron, and a cross-bar $C^2$ at their rear ends. The mating bars C have elongated openings, as clearly shown in Fig. 2, through which the carriage-axle A is extended, and rollers $C^8$ on the axle A facilitate the lateral motions of the auxiliary frame relative to the carriage-frame and line of advance, as required to reduce friction.

$C^4$ is a rock-shaft in bearings formed in or fixed to the front ends of the mating side bars C. It has a central enlargement and a bore in said enlargement and is pivotally connected with the cross-bar $B^4$ of the runner-frame by means of a yoke $C^5$, fixed to said bar, and a pin $C^6$, that has an arm $C^7$, adapting it to serve as a lever for raising and lowering the runners relative to the carriage-frame.

D is a rock-shaft in bearings fixed to the bars C.

$D^2$ is an arm fixed to the central portion of the shaft D and pivotally connected with the rear end of the arm $C^7$ of the pin $C^6$ by means of a link $D^3$.

$D^4$ is a hand-lever pivoted to the rock-shaft D and carries a pawl adapted to engage a toothed sector $D^5$, that is fixed to the shaft at the side of said hand-lever in such a manner that the rock-shaft can be retained in a fixed position, as required, to govern the depth of furrow made by the heels of the runners $B^3$.

$D^6$ is a rearward extension of the arm $D^2$ for engaging and actuating a clutch-operating device.

F is a seat-support connected with the rock-shaft D and the cross-bar $C^2$ of the auxiliary frame.

$F^2$ is a clutch member fixed to the carriage-axle $A^2$.

$F^3$ is a clutch member slidingly connected with the axle A.

$F^4$ is a clutch-moving arm pivoted to the cross-bar $C^2$ of the auxiliary frame and its bifurcated front end strides the sliding clutch member $F^3$.

$F^5$ is an extension formed on or fixed to the arm $F^4$ and projects laterally to serve as a cam that is engaged by the rear extension $D^6$ of the arm $D^2$ in such a manner that a rearward motion of the hand-lever $D^4$ will, by means of a cam on the arm $F^4$, disengage the sliding clutch member $F^3$ from the fixed member $F^2$ on the axle A.

H is an internally-toothed ratchet-wheel formed on or fixed to the sliding clutch member $F^3$.

A pawl-carrier is fixed to the end of the sleeve $H^2$ on the axle A.

$H^3$ and $H^4$ are sprocket-wheels fixed to the sliding hub or sleeve $H^2$.

$H^5$ is a collar fixed to the axle A.

$H^6$ is a compressible coil-spring placed on the axle A between the fixed collar and the sliding hub or sleeve $H^2$ in such a manner that the spring will in its normal condition retain the sliding clutch member $F^3$ in engagement with the fixed member $F^2$, as required to rotate the ratchet-wheel H and the two sprocket-wheels $H^3$ and $H^4$ jointly and at equal speed with axle A.

J is a rock-shaft in bearings fixed to the side bars C of the auxiliary frame.

$J^2$ is a shaft-bearer on the lower free end of an arm $J^3$, fixed to the central portion of the rock-shaft J.

$J^4$ is a rotatable shaft in the bearer $J^2$, and $J^5$ represents mating markers fixed to the ends of the shaft to engage the ground as the carriage is advanced and the axle A rotated. The shaft $J^4$ is twice as long as the space between the runners $B^3$, so that in a return trip across a field the marker on one end of the shaft will travel over the marks or track made by the other marker, as required to maintain equal distances between parallel rows.

K is a sprocket-wheel fixed to the center of the shaft $J^4$, and $K^2$ a chain that connects said wheel with the sprocket-wheel $H^3$, rotatably and slidingly connected with the axle A in such a manner that when the sliding clutch member $F^3$ is disengaged from the fixed member $F^2$ on the axle A ratchet-wheels H and the sprocket-wheels $H^3$ and $H^4$ will be idle on the axle A to facilitate regulating the space between seeds dropped in the furrows made by the heels of the runners $B^3$ whenever such space becomes irregular or increased by the slipping of the fixed wheel $A^2$ on the axle A, that rotates said axle. Such result is accomplished by means of the pawls $l$ on the pawl-carrier $H^2$ coming into engagement with the internal teeth of the ratchet-wheel H, that is fixed to the clutch member $F^3$, whenever the lever $D^4$ is operated to disengage the sliding clutch member from the fixed member $F^2$ on the axle A.

M is a lever on the end of the rock-shaft J, and $M^2$ a rack fixed on one of the bars C of the auxiliary frame, as shown in Fig. 4, in such a manner that the axle $J^4$, carrying the markers on its ends, can be raised and lowered thereby, as required, to regulate the grip of the markers with the ground and to make the sprocket-wheels $H^3$ and $H^4$ on the axle A and the seed-dropping mechanism connected therewith inoperative when turning the machine about or for regulating the space between the points where the seeds are dropped.

N is a rotatable shaft in bearings fixed to the cross-bar $B^4$ for communicating motion to seed-dropping mechanism in the seed-boxes (not shown) designed to be supported at the ends of said cross-bar. The shaft N has a fixed sprocket-wheel $N^2$ at its center, and a chain $N^3$ connects it with the wheel $H^4$ on the axle A.

P is a lever connected with the end portion of the rock-shaft B and provided with hooks $P^2$ and $P^3$, adapted in shape at its free end to hook over the axle A, as required to retain the scrapers on the ends of the shaft inoperative, as shown in Figs. 4 and 5, or in engagement with carriage-wheels.

Having described the construction and function of each element and subcombination of my invention, its practical operation and utility will be understood by persons familiar with the art to which it pertains.

What I claim as new, and desire to secure by Letters Patent, is—

1. In a corn-planter the combination of a carriage-frame composed of two mating side bars having coinciding slots to admit an axle and connected by a cross-bar at their rear ends, a rotatable axle extended through said slots and slidably and pivotally connected with said mating bar and the cross-bar of a frame fixed to runners hinged to the front ends of the mating side bars, to operate in the manner set forth for the purposes stated.

2. In a corn-planter, the combination of a carriage-frame composed of two mating side bars connected by a cross-bar at their rear ends, a rotatable axle slidably and pivotally connected with said mating bars and the cross-bar of a frame fixed to runners hinged to the front ends of the mating side bars, and an auxiliary frame pivotally connected with the axle, to operate in the manner set forth for the purposes stated.

3. In a corn-planter, the combination of a carriage-frame composed of two mating side bars connected by a cross-bar at their rear ends, a rotatable axle pivotally connected with said mating bar and the cross-bar of a frame fixed to runners hinged to the front ends of the mating side bars and an auxiliary frame pivotally connected with the axle and means for raising and lowering the runner-frame relative to the carriage-frame, to operate in the manner set forth for the purposes stated.

4. In a corn-planter, a carriage-frame pivotally connected with a rotatable axle, a traction-wheel fixed to one end of the axle, a mating wheel mounted loosely on the other end of the axle, an auxiliary frame pivotally and slidingly connected with said axle, a frame on runners hinged to the front ends of the side bars of the carriage-frame, a rock-shaft mounted on the side bars of the auxiliary frame, a hand-lever pivoted to the rock-shaft, an arm extended forward from the lever and connected with the frame on runners, and means for retaining the lever and rock-shaft stationary, arranged and combined to operate in the manner set forth for the purposes stated.

5. In a corn-planter, an auxiliary frame consisting of two mating side bars made of angle-iron having coinciding elongated openings for the passage of a carriage-axle and connected at their front and rear ends, a carriage-frame and a rotatable axle mounted in bearings fixed to the carriage-frame and extended through said openings in the side bars of the auxiliary frame, arranged and combined to operate in the manner set forth for the purposes stated.

6. In a corn-planter, a carriage-axle, a clutch member fixed to one end portion of the axle, a mating clutch member slidingly and rotatably connected with the axle, an internally-toothed ratchet-wheel fixed to said sliding clutch member, a sleeve having two fixed sprocket-wheels slidingly and rotatably mounted on the axle, a pawl-carrier fixed to the end of said sleeve, a coiled spring and a fixed collar on the axle, arranged and combined as shown and described simultaneously operating seed-dropping and marking mechanisms in the manner set forth for the purposes stated.

7. In a corn-planter, a carriage-axle, a clutch member fixed to one end portion of the axle, a mating clutch member slidingly and rotatably connected with the axle, an internally-toothed ratchet-wheel fixed to said sliding clutch member, a sleeve having two fixed sprocket-wheels slidingly and rotatably mounted on the axle, a pawl-carrier fixed to the end of said sleeve and a coiled spring on the axle in engagement with the end of said sleeve and a fixed collar on the axle, a carriage-frame and wheels to support the axle, a rock-shaft in bearings fixed to the frame in front of the axle, a shaft-bearer fixed to the rock-shaft, a rotatable shaft carried by the free end of said bearer, markers on the ends of the shaft a sprocket-wheel fixed to the center of the shaft and a chain on said wheel and one of the sprocket-wheels on the sleeve on the carriage-axle, all arranged and combined as shown and described for the purposes stated.

8. In a corn-planter, a carriage-axle, a clutch member fixed to one end portion of the axle, a mating clutch member slidingly and rotatably connected with the axle, an internally-toothed ratchet-wheel fixed to said sliding clutch member, a sleeve having two fixed sprocket-wheels slidingly and rotatably mounted on the axle, a pawl-carrier fixed to the end of said sleeve and a coiled spring on the axle in engagement with the end of said sleeve and a fixed collar on the axle, a carriage-frame and wheels to support the axle, a rock-shaft in bearings fixed to the frame in front of the axle, a shaft-bearer fixed to the rock-shaft, a rotatable shaft carried by the free end of said bearer, markers on the ends of the shaft, a sprocket-wheel fixed to the center of the shaft, and a chain on said wheel and one of the sprocket-wheels on the sleeve on the carriage-axle, and means for raising and lowering the shaft carrying the markers, all arranged and combined as shown and described for the purposes stated.

9. In a corn-planter, a carriage-axle, a clutch member fixed to one end portion of the axle, a mating clutch member slidingly and rotatably connected with the axle, an internally-toothed ratchet-wheel fixed to said sliding clutch member, a sleeve having two fixed sprocket-wheels slidingly and rotatably mounted on the axle, a pawl-carrier fixed to the end of said sleeve, and a coiled spring on the axle in engagement with the end of said sleeve and a fixed collar on the axle, a carriage-frame and wheels to support the axle, a rock-shaft in bearings fixed to the frame in front of the axle, a shaft-bearer fixed to the rock-shaft, a rotatable shaft carried by the free end of said bearer, markers on the ends of the shaft, a sprocket-wheel fixed to the center of the shaft and a chain on said wheel and one of the sprocket-wheels on the sleeve on the carriage-axle, means for raising and lowering the shaft carrying the markers and means for operating the sliding clutch member on the carriage-axle, all arranged and combined as shown and described for the purposes stated.

10. In a corn-planter, a carriage-frame, an axle rotatably connected with the frame, an auxiliary frame slidingly connecting the axle and the carriage-frame, a sprocket-wheel loosely mounted on the axle, a rock-shaft in bearings on the parallel sides of the auxiliary frame, a shaft-bearer fixed to said rock-shaft, a shaft having a fixed sprocket-wheel at its center and markers at its ends mounted on the free end of said bearer, a chain connecting the sprocket-wheel on the shaft with the sprocket-wheel on the axle, a lever fixed to the end of said shaft, a rack fixed to the said frame to be engaged by a pawl carried by the lever, all arranged and combined to operate in the manner set forth for the purposes stated.

11. In a corn-planter, a carriage-frame mounted on an axle and wheels, a rock-shaft mounted on the rear end of the frame, wheel-scrapers on the ends of the rock-shaft, a bar having hooks at its end portions adapted to engage the carriage-axle pivotally connected with one of the scrapers on the end of the rock-shaft, and adapted to be adjustably connected with the axle in the manner set forth for the purposes stated.

12. In a corn-planter, a carriage-frame mounted on a rotatable carriage-axle, a runner-frame hinged to the front ends of the parallel sides of the carriage-frame, a rotatable shaft having a fixed sprocket-wheel mounted on the runner-frame for operating seed-dropping mechanism, an auxiliary frame slidably connected with the carriage-axle, two sprocket-wheels fixed on a sleeve on the axle, a rock-shaft on the auxiliary frame, a shaft-bearer fixed to the rock-shaft, a shaft having markers on its ends and a sprocket-wheel at the center carried by said bearer, clutch mechanism on the carriage-axle to engage said sleeve, means for operating the sliding member of the clutch on the axle and a chain connecting the sprocket-wheel on the sleeve on the axle with the sprocket-wheel on the shaft on the runner-frame, all arranged and combined to operate in the manner set forth for the purposes stated.

LEROY J. LINDSAY.

Witnesses:
W. A. HOCKETT,
WILLIAM ASHCRAFT.